United States Patent [19]

McCord

[11] 4,394,216

[45] Jul. 19, 1983

[54] VAPOR CONDENSATE RETURN MEANS IN A VAPOR GENERATING AND RECOVERY APPARATUS

[76] Inventor: James W. McCord, 9101 Nottingham Parkway, Louisville, Ky. 40222

[21] Appl. No.: 334,169

[22] Filed: Dec. 24, 1981

[51] Int. Cl.³ ............................................. B01D 3/02
[52] U.S. Cl. .................................. 202/170; 202/181; 202/193; 202/196
[58] Field of Search ....................... 202/181, 168–170, 202/193, 196

[56] References Cited

U.S. PATENT DOCUMENTS 3,232,594 2/1966 Ord ..................................... 202/170

Primary Examiner—Frank Sever
Attorney, Agent, or Firm—Charles G. Lamb

[57] ABSTRACT

An apparatus and method for recovering two immiscible fluids in a vapor generating and recovery apparatus wherein water, an immiscible cleaning solvent, and an emuslifying agent are subjected to sufficient heat in a first chamber to vaporize the water and the immiscible solvent and then condense in a second chamber the water and immiscible solvent, returning in separate streams the water and solvent to the first chamber.

12 Claims, 3 Drawing Figures

VAPOR CONDENSATE RETURN MEANS IN A VAPOR GENERATING AND RECOVERY APPARATUS

BACKGROUND OF THE INVENTION (1) Field of the Invention

This invention relates to the recovering of immiscible fluids in a vapor generator. More particularly, this invention relates to a vapor generating and recovering apparatus for vaporizing two immiscible components in a first chamber and condensing the vaporized components in a second chamber and returning the individual components in separate streams to the first chamber. Even more particularly, this invention relates to an apparatus and a process for carrying out a vapor generating and recovering operation using immiscible fluid components.

(2) Description of the Prior Art

In the cleaning of hard to clean objects, boiling cleaning solutions have been utilized in the removing of the undesirable particulate matter therefrom. The cleaning of these objects, tools, parts, and the like, is accomplished by immersing the soiled objects into the hot, boiling cleaning solution. In many apparatuses, at least two chambers are provided for carrying out the operation, one being for vaporizing at least one component of the cleaning solution and the other being for condensing and recovering the vaporized components, then returning the components to the vaporizing chamber.

However, in the use of two immiscible fluids having different boiling temperatures, the recovery of the fluids and re-use in order to maintain a balanced cleaning operation without the continual addition of one of the fluids to the system has presented a problem for use of a two component-immiscible fluid cleaning solution.

SUMMARY OF THE INVENTION

It is an object of the invention to provide an apparatus for vaporizing a liquid mixture including water, an immiscible solvent, and an emulsifying agent; condensing the vaporized liquid; and returning the condensate to the vaporizing section of the apparatus. It is another object of this invention to provide a process for vaporizing a liquid mixture including water, an immiscible solvent, and an emulsifying agent; condensing the vaporized liquid; and returning the individual vaporized components in a separate stream to the vaporizing chamber.

The present invention resides in the discovery that in many operations, the use of two immiscible fluids with an emulsifying agent can be maintained at a given cleaning composition with the minimal addition of either of the components which is being vaporized.

Mixtures utilized in the present invention include, water, an immiscible cleaning solvent heavier than water, and an emulsifying agent. The immiscible cleaning solvent is generally a halogenated organic compound having two or less carbon atoms and the emulsifying agent may be any of the anionic, cationic, or nonionic wetting agents presently available. Preferred halogenated organic compounds include, for example, trichloromonofluoromethane, trichlorotrifluoroethane, methylene chloride, methyl chloroform, and the like.

In a use solution, which is generally maintained at substantially the same mix throughout the vaporizing and condensing operation, the solution usually includes from about 0.1 to 25 parts by weight of water; from about 65 to 99.85 parts by weight cleaning solvent; and from about 0.05 to 10 parts by weight emulsifier.

More particularly, the present invention provides a process for vapor generating and recovery comprising the steps of: boiling in a first chamber a cleaning solution containing water, an immiscible solvent having two or less carbon atoms, and an emulsifying agent at a temperature above the boiling temperature of water under partial pressure and the immiscible solvent and below the boiling temperature of the emulsifying agent; condensing the vaporized water and immiscible solvents in a second chamber; and, transferring the water and immiscible solvent from the second chamber to the first chamber in separate streams.

Even more particularly, the present invention provides an apparatus for vapor generating and recovery comprising; a housing having a vaporizing chamber and a condensing chamber therein separated by a weir of preselected height; means to add heat to said vaporizing chamber and means to remove heat from said condensing chamber; and, means to transfer condensate from said condensing chamber to said vaporizing chamber, the means to transfer condensate including means to separate components within the condensate and return said separated components in separate streams to said vaporizing chamber.

Furthermore, the present invention also provides a vapor generating and recovery apparatus comprising:

a housing having a vaporizing chamber sub-divided into a plurality of sub-chambers by weirs of preselected height, and a condensing chamber separated from said vaporizing chamber by a first weir of a preselected height greater than that of any of said weirs sub-dividing said vaporizing chamber;

means to add heat to at least one of said sub-chambers of said vaporizing chamber, and means to remove heat from said condensing chamber;

means to transfer condensate from said condensing chamber to at least one of said vaporizing sub-chambers, said transfer means including means to separate components within the condensate and returning at least one of said separated components to at least one of said vaporizing sub-chambers;

skimmer means located in at least one of said vaporizing sub-chambers for skimming the surface of a solution in at least one of said vaporizing sub-chambers; and, means to transfer solution from one of said sub-chambers to another of said sub-chambers.

BRIEF DESCRIPTION OF THE DRAWING

Referring to the drawing.

DESCRIPTION OF THE PREFERRED EMBODIMENTS

Figure 1:
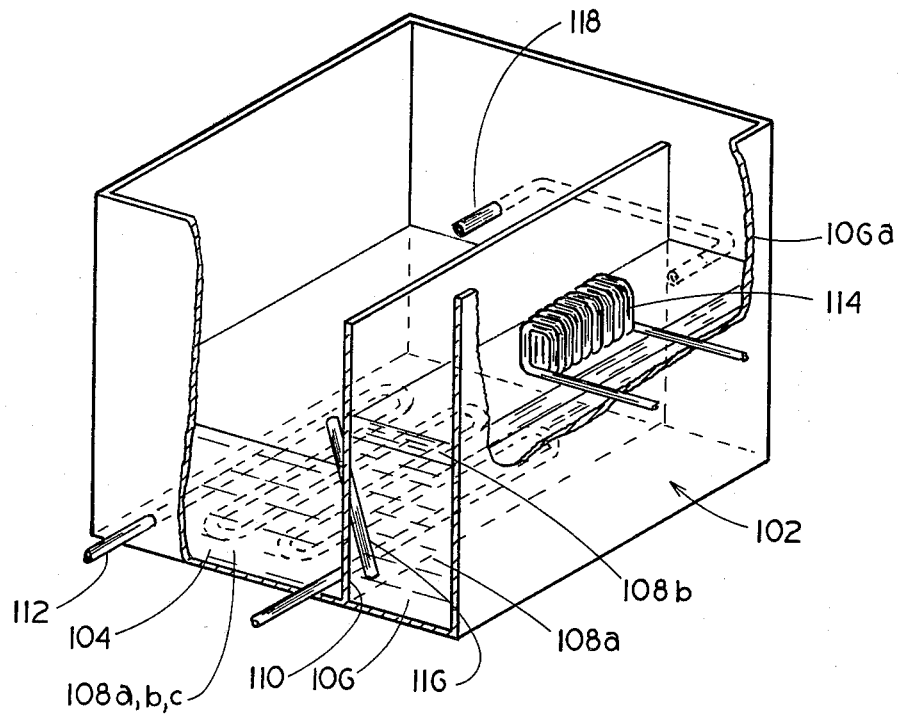
FIG. 1 is a perspective view, with selected portions cut-away, of one preferred embodiment of the present invention.

In FIG. 1, a housing 102 having a vaporizing chamber 104 and a condensing chamber 106 are provided for vaporizing and condensing a cleaning solution including fluids identified as 108a, b, c. The cleaning solution 108a, b, c, is a liquid mixture containing a cleaning solvent 108a which is immiscible with and heavier than water, identified by the numeral 108b, and an emulsifying agent 108c.

Disposed between and separating chambers 104 and 106 is a weir 110 of preselected height.

Disposed along the bottom of the chamber 104 is a heated coil 112 which provides heat to the solution 108a, b, c, coil 112 providing sufficient heat to vaporize components 108a and 108b.

Mounted along wall 106a of the chamber 106 is a condensing coil 114, condensing coil 114 being positioned below the upper extremity of the weir 110. Condensing coil 114 is provided to maintain a preselected temperature in chamber 106 below the vaporizing temperature of the liquid components 108a and water 108b thereby condensing the components 108a and 108b into chamber 106 and preventing the vaporizing components from escaping the housing 102.

The means for adding heat to heating coil 112 and removing heat in condensing coil 114 may be any known in the art, but one preferred means is described in U.S. Pat. No. 4,003,798.

Disposed between compartments 104 and 106 and in flow communication therewith are a pair of conduits 116 and 118. Conduit 116, angularly disposed vertically, is in flow communication between chambers 104 and 106 with the lower end (inlet) being near the bottom of chamber 106 and the upper end (outlet) being at a preselected position below the upper extremity of weir 110 and above the desired operating level of the solution 108a, b, c in the chamber 104. In FIG. 1, conduit 116 extends through weir 110, but it is realized that conduit 116 may extend around and outside the chambers without departing from the scope and spirit of the present invention. Conduit 118 is positioned substantially horizontal for flow communication from chamber 106 to 104 and is shown as extending around the weir 110. However, conduit 118 may extend through the weir 110 as vertical positioning of the inlet and outlet of the conduit 118 is the critical factors to be considered. The inlet and outlet of conduit 118 are at a selected position above the outlet of conduit 116 and below the upper extremity of weir 110.

In use, when the level of component 108a in chamber 106 reaches a level equal to the outlet level of conduit 116, component 108a flows from chamber 106 to chamber 104. Also, since the water 108b is lighter than component 108a, and is immiscible therewith without an emulsifier, water 108b is on top of component 108a and when the total condensate level in chamber 106 reaches the level of the conduit 118, water then flows from chamber 106 and into chamber 104.

Figure 2:
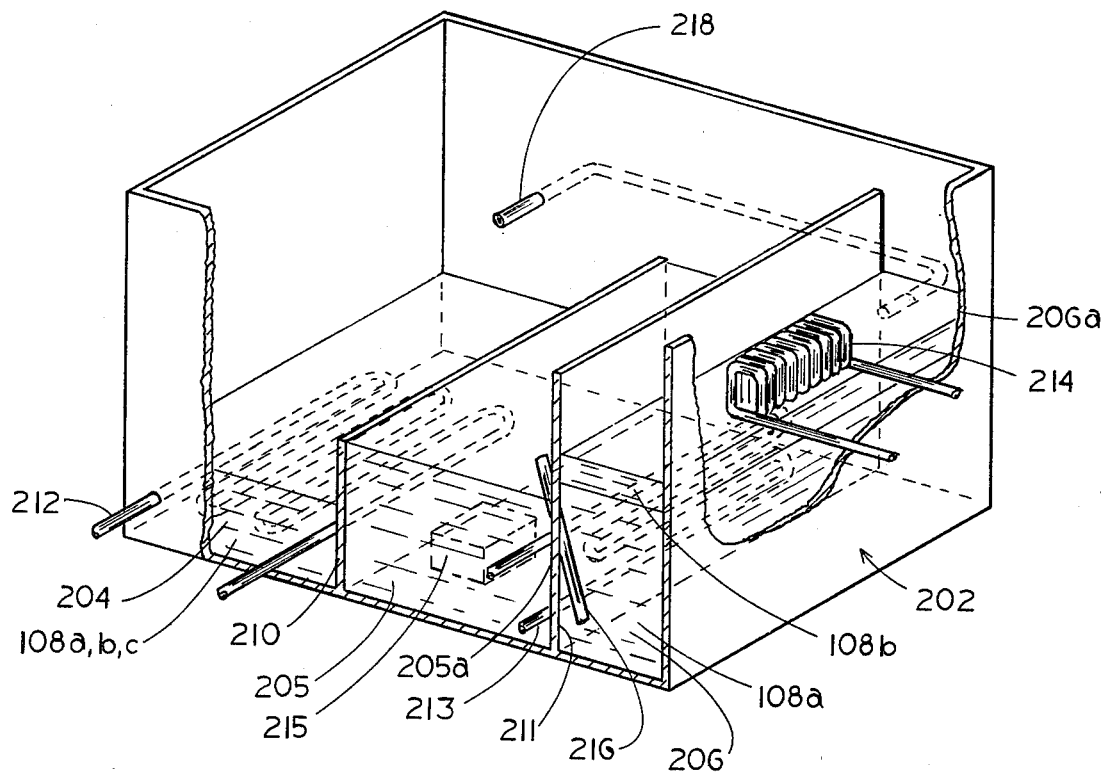
FIG. 2 is a perspective view, with selected portions cut-away, of another preferred embodiment of the present invention.

In FIG. 2, a housing 202 for use as a vapor generating and recovery apparatus is provided with a vaporizing chamber 204 and 205, and, a condensing chamber 206 for vaporizing and condensing the vaporized cleaning components in solution 108a, b, c, as described hereinbefore in describing FIG. 1.

Disposed between and separating the chambers including the sub-chambers are two weirs 210 and 211, each weir being of preselected height. Weir 210 is disposed to separate the vaporizing sub-chambers 204 and 205 and weir 211 is disposed to separate sub-chamber 205 and chamber 206, separating the two vaporizing sub-chambers of the degreaser and the condensing chamber. Weir 201 is an overflow weir from sub-chamber 205 into sub-chamber 204 whereas weir 211 is at a height so that vapors from the vaporizing sub-chambers can move freely into the condensing chamber, but yet provides a sufficient barrier so that the temperature in the vaporizing portion of the apparatus and the temperature in the condensing portion of the apparatus can be maintained.

Disposed along the bottom of the sub-chamber 204 is a heating coil 212 which provides heat to the solution 108a, b, c. Also, a heating coil 213 is mounted along the wall 205a of weir 211 in sub-chamber 205. Coils 212 and 213 provide sufficient heat to the solution 108a, b, c to boil and vaporize the components 108a and 108b in sub-chambers 204 and 205.

Mounted onto the bottom of the sub-chamber 205 is an ultrasonic transducer 215 which provides cavitating waves in sub-chamber 205 so as to dislodge hard to remove soil from objects which are immersed into the boiling mixture in sub-chamber 205. Ultrasonic transducer 215 may be operated in response to any ultrasonic generating means known in the art.

Mounted onto or along the wall 206a of the chamber 206 is a condensing coil 214, condensing coil 214 being positioned below the upper extremity of the weir 211. Condensing coil 214 is provided to maintain a preselected temperature in chamber 206 below the vaporizing temperature of the liquid component 108a and water 108b thereby condensing the components 108a and 108b and preventing the vaporizing components from escaping the housing 202.

The means for adding heat to heating coils 212 and 213 and removing heat in condensing coil 214 may be any known in the art, but one preferred means is described in U.S. Pat. No. 4,003,798.

Disposed between compartments 205 and 206 and in flow communication therewith is a conduit 216. Conduit 216 is angularly disposed, vertically, with the lower end (inlet) being near the bottom of chamber 206 and the upper end (outlet) being at a preselected position below the upper extremity of weir 211 and above the upper extremity of weir 210. In FIG. 2, conduit 216 extends through weir 211, but it is realized that conduit 216 may extend around the weir 211 and outside the chambers without departing from the scope and spirit of the present invention.

Conduit 218 is positioned substantially horizontal for flow communication from chamber 206 to chamber 204. The inlet and outlet of conduit 218 are at a selected position above the outlet of conduit 216 and below the upper extremity of weir 211.

In use, liquids 108a and b of cleaning solution 108a, b, c, are vaporized in sub-chambers 204 and 205 and condensed in chamber 206. In sub-chamber 205, which is predominantly liquid 108a, not only does vaporizing occur, but a large portion is continually cascading over the weir 210 during vaporizing and condensing as component 108a flows from chamber 206 to sub-chamber 205 through conduit 216. Also, since the water 108b is lighter than component 108a, and in chamber 206 is immiscible therewith, water flows through conduit 218 from chamber 206 into sub-chamber 204.

Figure 3:
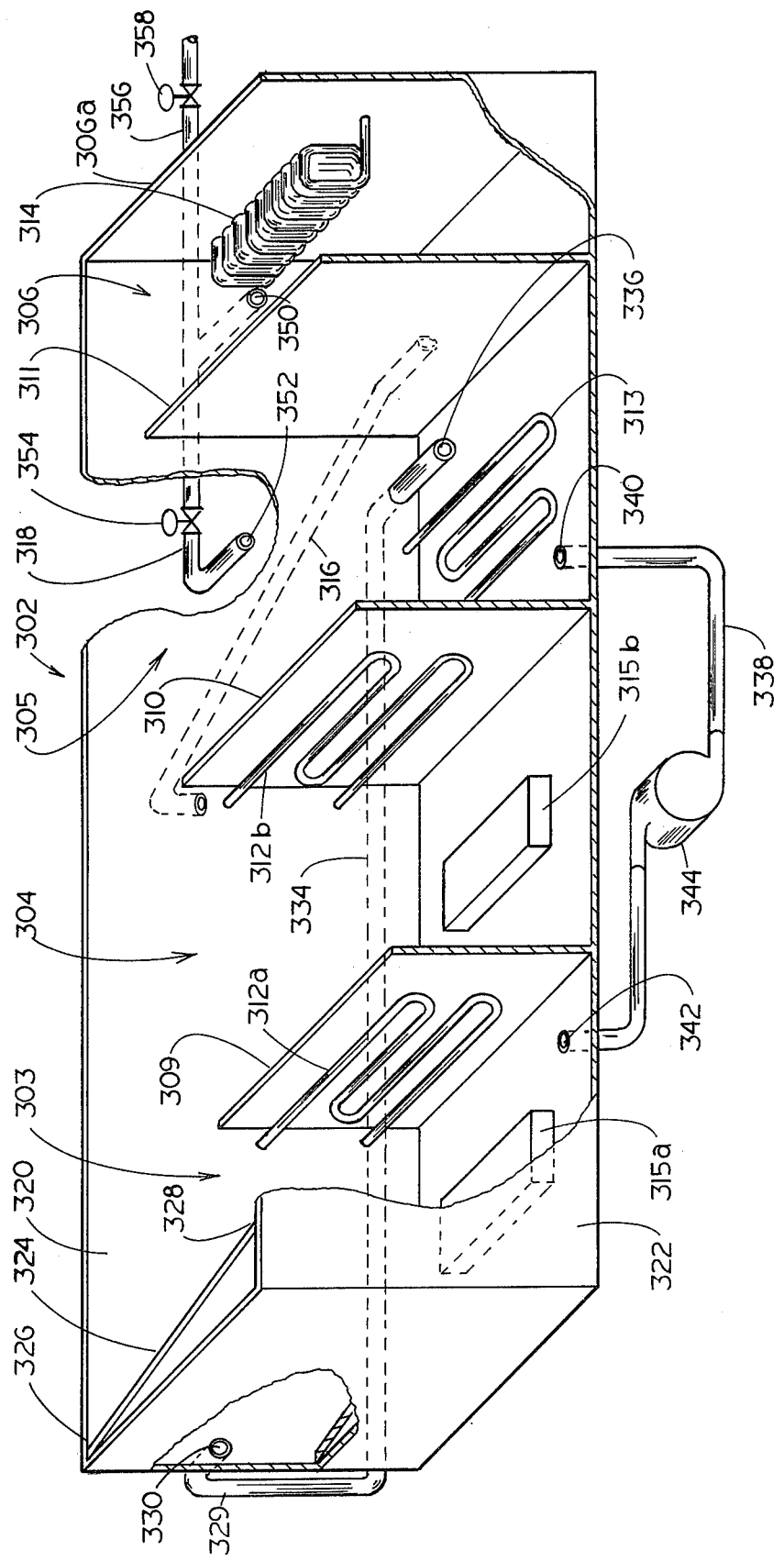
FIG. 3 is a perspective view, with selected portions cut-away, of yet another preferred embodiment of the present invention.

FIG. 3 illustrates another advantageous embodiment of a vapor generating and recovery apparatus having a housing 302 provided with a vaporizing chamber divided into three sub-chambers 303, 304 and 305, and a condensing chamber 306 for vaporizing and condensing the vaporized components in solution 108a, b, c as discussed hereinbefore in regards to the embodiment of FIG. 1.

Disposed between and separating the vaporizing chamber from the condensing chamber, and sub-dividing the vaporizing chamber are three weirs 309, 310 and 311, each of a different selective height. As shown, weir 309 separates the vaporizing sub-chambers 303 and 304, weir 310 separates vaporizing sub-chambers 304 and 305, and weir 311 separates the vaporizing sub-chamber 305 from the condensing chamber 306. The weir 309 is an overflow weir for solution flowing from sub-chamber 304 into sub-chamber 303, and the weir 310 terminates above weir 309 to prevent solution flowing from sub-chamber 304 into sub-chamber 305. The weir 311 is of such a height so that vapors from the vaporizing sub-chambers 303, 304 and 305 can move freely into the condensing chamber 306, and defines the vapor zone of the apparatus.

As illustrated, a heating coil 312a is disposed vertically along the weir 309 in the sub-chamber 303, a heating coil 312b is disposed vertically along the weir 310 in the sub-chamber 304, and a heating coil 313 is mounted along the bottom of the sub-chamber 305 between the weirs 310 and 311. The heating coils 312a, 312b and 313 provide sufficient heat to the solution 108a, b, c in the sub-chambers 303, 304 and 305, respectively, to boil and vaporize the components 108a and b therefrom.

An ultrasonic transducer 315a is mounted in sub-chamber 303 and another ultrasonic transducer 315b is mounted in sub-chamber 304. These ultrasonic transducers 315a and 315b create cavitating waves in the solution in the sub-chambers 303 and 304, respectively, so as to dislodge hard to remove soil from objects immersed in the boiling solution in the sub-chambers 303 and 304. These ultrasonic transducers may be operated in response to any ultrasonic generating means.

A condensing coil 314 is mounted along the wall 306a of the housing 302 in the condensing chamber 306. Preferably, the condensing coil 314 is positioned below the upper extremity of the weir 311. The condensing coil 314 is provided to maintain a preselected temperature in the chamber 306 below the vaporizing temperature of the liquid components 108a and 108b (water) thereby condensing the components 108a and 108b, and preventing the vaporizing components from escaping the housing 302.

It should be understood that the means for adding heat to heating coils 312a, 312b and 313, and for removing heat in the condensing coil 314 may be virtually any type known in the art, but one preferred means is described in U.S. Pat. No. 4,003,798.

A conduit 316 is located to establish flow communication between the condensing chamber 306 and the sub-chamber 304. The conduit 316 is angularly disposed, vertically, with the lower (inlet) end being located near the bottom of the condensing chamber 306 and the upper (outlet) end positioned below the upper extremity of the weir 311 and above the upper extremity of the weir 309. As illustrated in FIG. 3, the conduit 316 extends around the weir 311 and above the upper extremity of weir 310.

As shown, the sub-chamber 303 is defined by the weir 309, the opposite housing walls 320 and 322 of the housing 302, and a wall 324 opposite weir 309. The wall 324 is oriented in non-parallel relationship to the weir 309, and cooperates with the housing wall 320 to define a sub-chamber corner 326 and with the housing wall 322 to define a sub-chamber corner 328. Due to the non-parallel relationship of the wall 324 and weir 309, the corner 326 is further away from the weir 309 than is the corner 328.

Skimmer means are located in the corner 326 furtherest from the weir 309 for skimming the surface of the solution to remove lighter density matter. Generally, this includes dirty particles floating therein and from the sub-chamber 303. The skimmer means is shown as comprising a conduit 329 having its first open end (inlet) 330 generally below the upper extremity of the weir 309. Thus, the open end 330 of the conduit 329 is substantially at the operating level of the solution 108a, b, c, in the sub-chamber 303. The second open end of the conduit pipe (outlet) 329 is in flow communication with the sub-chamber 305 and is identified by the numeral 336. The open end 336 of the conduit 329 is generally located in and near the bottom of sub-chamber 305.

The sub-chamber 305 is in fluid communication with the sub-chamber 303 by means of a conduit 338 which has an open inlet end 340 at the bottom of the sub-chamber 305 and an open outlet end 342 at the bottom of the sub-chamber 303. A fluid transfer pump 344 is located in the conduit 338 for moving the solution from sub-chamber 305 to sub-chamber 303 and to maintain the same component chemistry in sub-chambers 303 and 305. Preferably, the open outlet end 342 is positioned adjacent the weir 309.

The heating coil 312b creates a temperature differential across the sub-chamber 304 which causes the cleaning solution to move generally from the weir 310 toward the weir 309. Further, the coil 312b causes a boiling action at the weir 310 in the sub-chamber 304 so that the cleaning solution will roll across the sub-chamber and over the upper extremity of the weir 309 and into the sub-chamber 303 moving the floating dirt particles from the sub-chamber 304 into the sub-chamber 303. Likewise, the heating coil 312a creates a temperature differential across the sub-chamber 303 causing the cleaning solution to move generally from the weir 309 toward the far corner 326. The coil 312a also causes a boiling action at the weir 309 in the sub-chamber 303 so that the cleaning solution will roll across the sub-chamber 303 to the corner 326 moving the floating dirt particles into the open end 330 of the conduit 329.

As the level of the condensed component 108a in the condensing chamber 306 reaches a level equal to the outlet end of the conduit 316, the condensed component 108a flows from the condensing chamber 306 through the conduit 316 and into sub-chamber 304 replenishing the supply of component 108a in the sub-chamber 304.

The fluid pump 344 moves the separated component 108a in the sub-chamber 305 through the conduit 338 to the sub-chamber 303 replenishing the supply of solvent in the sub-chamber 303. The location of the outlet end 342 of the conduit 338 in the sub-chamber 303 reinforces the movement of the solvent from the weir 309 toward the far corner 326 caused by the temperature differential by hydraulically pushing the solution in the sub-chamber 303 toward the far corner 326.

Conduit 318 is positioned substantially horizontal for flow communication from chamber 306 to sub-chamber 305. The inlet 350 and outlet 352 of conduit 318 are at a selected position above the outlet of conduit 316 and below the upper extremity of weir 311. Conduit 318 is also provided with a valve 354 therein and is in flow communication with conduit 356, which is also provided with valve 358 therein. In this arrangement, water, the lighter density fluid, can be removed to outside the apparatus or re-plenished as desired.

Objects to be cleaned, polished, dried, developed, or degreased are first immersed in the solution in sub-chamber 303 wherein the primary cleaning of the object is accomplished by the dissolution utilizing the heated cavitating solvent therein. Next, the objects are moved into the heated, cavitating solvent solution in sub-chamber 304 wherein the remaining particles are removed from the object. The cleaned objects are next moved to the sub-chamber 305 wherein they are rinsed by submerging them into the solution contained therein.

The apparatus of FIG. 3 provides a closed system wherein all of the component 108a is recycled and re-used, and there is virtually no loss of solvent.

It will be realized that various changes may be made to the specific embodiments shown and described without departing from the principles and spirit of the present invention.

What is claimed is:

1. A vapor generating and recovery apparatus comprising:
   a housing having a vaporizing chamber and a condensing chamber therein separated by a first weir of preselected height;
   means to add heat to said vaporizing chamber and means to remove heat from said condensing chamber; and,
   means to transfer condensate from said condensing chamber, to said vaporizing chamber, said means to transfer condensate including means to separate components within the condensate and return said separated components in separate streams to said vaporizing chamber, said means to remove heat being disposed within said condensing chamber below the upper extremity of said weir and spaced sufficiently above said means to transfer condensate for providing a constant vapor blanket over the means to remove heat from the condensing chamber.

2. The apparatus of claim 1 wherein said means to separate components includes a first fluid transfer means having an inlet in said condensing chamber and an outlet in said vaporizing chamber, the outlet being above said inlet and the liquid level in the vaporizing chamber and below the upper extremity of said first weir, said means to separate components further including a second fluid transfer means having an inlet and outlet at or above the outlet of the first heat transfer means and below the upper extremity of the first weir.

3. The apparatus of claim 2 wherein said first fluid transfer means is a conduit and said second fluid transfer means is a conduit.

4. The apparatus of claim 2 wherein the vaporizing chamber includes a first and second sub-chamber and the sub-chambers are separated by a second weir of preselected height.

5. The apparatus of claim 4 wherein the outlet of one of said fluid transfer means is in one sub-chamber and the outlet of the other said fluid transfer means is in the other sub-chamber.

6. The apparatus of claim 4 wherein the second sub-chamber is provided with ultrasonic vibrating means mounted therein and the outlet of said first fluid transfer means is in flow communication with said second sub-chamber and the outlet of said second fluid transfer means is in flow communication with said first sub-chamber.

7. The apparatus of claim 6 wherein the first weir separates the condensing chamber from the second sub-chamber and the second sub-chamber is provided with heat means mounted along the wall of said first weir.

8. The apparatus of claim 1 wherein the means to add heat is a heating device disposed along the bottom of said vaporizing chamber.

9. A vapor generating and recovery apparatus comprising:
   a housing having a vaporizing chamber sub-divided into a plurality of sub-chambers by weirs of preselected height, and a condensing chamber separated from said vaporizing chamber by a first weir of a preselected height greater than that of any said weirs sub-dividing said vaporizing chamber;
   means to add heat to at least one of said sub-chambers of said vaporizing chamber, and means to remove heat from said condensing chamber;
   means to transfer condensate from said condensing chamber to at least one of said vaporizing sub-chambers, said transfer means including means to separate components within the condensate and in returning at least one of said separated components to at least one of said vaporizing sub-chambers, said means to remove heat being disposed within said condensing chamber below the upper extremity of said weir.

10. The apparatus of claim 9 wherein said means to separate components includes a first fluid transfer means having an inlet in said condensing chamber and an outlet in one of said sub-chambers, the outlet being above said inlet and the liquid level in said one of said sub-chambers and below the upper extremity of said first weir, said means to separate components further including a second fluid transfer means having an inlet and outlet at or above the outlet of the first heat transfer means and below the upper extremity of the first weir.

11. The apparatus of claim 10, wherein said means to add heat includes means to add heat to one of said sub-chambers at a weir dividing it from the other sub-chambers whereby upon addition of heat to a solution in said sub-chamber a temperature differential across said sub-chamber is created.

12. The apparatus of claim 10 wherein said means to transfer condensate from one of said sub-chambers to another of said sub-chambers further includes pump means for transferring a solution under pressure.

* * * * *